Patented Aug. 25, 1942

2,293,729

UNITED STATES PATENT OFFICE 2,293,729

PROCESS FOR HYDROGENATING SOYBEAN OIL

Arne Gudheim, Winchester, Mass., assignor to Lever Brothers Company, Cambridge, Mass., a corporation of Maine No Drawing. Application August 3, 1940, Serial No. 351,105

7 Claims. (Cl. 260—409)

The present invention relates to food products prepared from oleaginous materials, and, more particularly, to hydrogenated edible products adapted to be used as shortenings and like food products made from relatively highly unsaturated oils such as soybean oil. The invention resides, more particularly, in a novel method of hydrogenating the relatively highly unsaturated oils, thus permitting their use in the production of final shortening products characterized by improved odor, flavor, penetration and stability against reversion under deep frying conditions.

It is well known that the edible vegetable oils of relatively low iodine value, such as palm oil, cottonseed oil and peanut oil, upon being processed in accordance with the accepted practice, are suitable for use in substantial proportions in good grade shortenings as measured by present day commercial standards. The more unsaturated oils, such as soybean oil, linseed oil, and various fish oils, on the other hand, may be used only sparingly as the result of the difficulty experienced in modifying the characteristics of these oils to fulfill the essential requirements of an acceptable food product.

In accordance with my invention, there is provided a method of hydrogenating the relatively highly unsaturated oils to form improved and novel edible substances which exhibit the characteristics required for their use in substantial amounts in good grade shortenings and like food products.

It is desired that the final shortening product which is generally a mixture of oils or fats, or both, shall have a congeal point in the neighborhood of that of lard, or slightly higher, for most general uses. The congeal point may be defined as the highest temperature contained in the cooling curve of the melted shortening due to the liberation of the latent heat of fusion. The significance of the congeal is much the same as titre and is a general indication of hardness.

The softness or plasticity of the shortening which must be plastic and workable over a reasonable range of temperatures, influences the ability of the shortening to be readily creamed and used in the production of cakes of good volume, contour and texture.

The hardness of a fat may be defined in terms of its penetration value. This is an arbitrary value conveniently measured by the depth of penetration of a standard plunger needle of definite dimensions and weight into the material to be tested, under a given load for a definite temperature and time. Under present day standards, the penetration of a good grade shortening for domestic use is generally within the range of 220 to 250. For shortenings used with mechanical mixing, as in bakeries, the penetration may vary between 175 to 250. It will be apparent that in order to utilize substantial proportions of a given fat in good commercial shortenings, the fat must have substantially the same penetration characteristics as the final shortening product.

A hard fat having a low penetration and high congeal point may be used in shortenings in only limited amounts and by blending the same with a relatively soft component. The presence of the soft component renders shortening of this type unstable, and their lack of homogeneity is generally regarded as undesirable when judged by present day standards.

The oils which consist of the fatty substances of vegetable and animal sources comprise a mixture of esters, usually glycerol esters of fatty acids. The fatty acid components of the oils generally comprise both saturated and unsaturated radicals. The unsaturated compounds are those having double bonds or alkene linkages, often referred to as points of unsaturation which by convention signifies the existence of two carbon atoms, side by side, each of which may add on an additional monovalent atom or group. Compounds having double bonds are generally regarded as unstable and enter into many reactions and become compounds with a single linkage. The unsaturation (iodine value) of an oil is commonly measured by the quantity of iodine absorbed by a fat or oil under specified conditions.

As an example, the composition of a relatively highly unsaturated oil is evidenced by the following analysis which may be considered typical of a good quality soybean oil having an iodine value in the neighborhood of 135, (acids calculated as glycerides):

| | Per cent |
|---|---|
| Linolenic (3 double bonds) | 2.3 |
| Linoleic (2 double bonds) | 51.5 |
| Oleic (1 double bond) | 33.4 |
| Palmitic (saturated) | 6.8 |
| Stearic (saturated) | 4.4 |

It is well known that the glycerides and other esters of the unsaturated fatty acids naturally occurring in vegetable oils are capable of adding on oxygen at the points of double linkage or unsaturation in their fatty acid component, whereby they become more or less rancid, depending upon the amount of oxygen added. As a result of the tendency of the oils to add on oxygen from the atmosphere at the points of unsaturation in their fatty acid components, it is desirable to reduce the number of unsaturated components to an extent sufficient to impart stability to the oil over long periods of time. It is understood, however, that complete saturation characterized by the formation of a hard, brittle solid, is undesirable in a product for edible uses.

It is an object of my invention to provide a method of hydrogenating relatively highly unsaturated vegetable oils to obtain a hardened oil having a sufficiently low iodine value to be stable against oxidation over long periods of time and yet sufficiently plastic to be used in large proportions in good grade shortenings.

The utilization of soybean oil in edible products has become increasingly attractive from an economic standpoint. However, the use of soybean oil heretofore has been greatly limited, particularly in good grade edible products, because of the unique and undesirable odor reversion characteristics of soybean oil. The characteristics of soybean oil in this connection are discussed in some detail in the Epstein, et al. Patent No. 2,140,794, issued December 20, 1938, and in an article by M. M. Durkee entitled "Soybean Oil in the Food Industry," appearing in "Industrial and Engineering Chemistry," August, 1936, volume 28, pages 898-903.

Edible soybean oil which has been refined, bleached, hydrogenated and deodorized in the usual manner to approximately the hardness of a good grade shortening undergoes a type of spoilage under normal storage conditions which is known as reversion. It is characterized by the development of various "off" flavors and odors sometimes described as "beany" which subsequently may become intensified and altered with the production of other undesirable flavors and odors described as "oleo," "grassy" or "fishy." The odor reversion characteristics of soybean oil is not to be confused with the development of rancidity in oleaginous products, which is believed to be caused by the oxidation of unsaturated components in the product.

The reversion characteristic of soybean oil is also manifested in the keeping qualities of baked goods, such as biscuits and crackers prepared with shortenings containing soybean oil. The baked goods may quickly develop an odor making the product inedible or at least objectionable and distasteful. Observers have described the odor as "oleo" or "tallowy."

It is an object of my invention to provide a method of hydrogenating soybean oil to form a hardened product having a sufficiently high penetration to permit its use in substantial proportions in shortenings and characterized by a stability against the type of spoilage known as reversion which normally affects soybean oil products under ordinary conditions of storage.

A material proportion of hydrogenated shortening is utilized in deep fat frying. The more severe conditions of deep fat frying require the use of a shortening stable at high temperatures and upon prolonged heating. For example, in the practice of deep fat frying, it is usual to employ a large kettle of fat maintained at a temperature of approximately 375° F. Successive lots of food products are fried as required and with each a small quantity of fat is absorbed and removed from the kettle. Although the supply of fat in the kettle is replenished from time to time, the same kettle of fat may be used for several days or even weeks without complete replacement. It has been observed that shortenings containing soybean oil under these conditions very quickly acquire objectionable "off" flavors and odors described as "beany" or "grassy." This characteristic reversion of soybean oil, for example, is not to be confused with the development of rancidity in oils believed to be caused by the oxidation of unsaturated components. The objectionable flavors and odors which develop in soybean oil under the conditions of deep frying is not only objectionable during such operation, but it has been observed that these "off" flavors and odors are manifested in the products prepared with the soybean oil shortenings.

Accordingly, it is an object of my invention to provide a method of hardening soybean oil to produce a soybean oil product of improved plasticity which will not undergo spoilage of the type known as reversion of odor under the conditions of deep frying.

The hydrogenation of vegetable oils is usually accomplished at elevated temperatures and pressures and is brought about by contacting the oils with hydrogen gas in the presence of catalytically active materials, such as a selective nickel catalyst. During such hydrogenation processes the unsaturated fatty acids present as glycerides or esters are changed to the corresponding and more completely saturated acids which, in turn, affects the plasticity and the keeping qualities of the oil being treated.

In the treatment of the soybean oil to provide a hardened oil which is suitable for edible purposes including a stability against reversion under deep frying conditions, it has been thought necessary, in accordance with the generally accepted practice, to hydrogenate the oil to the relatively high titre of 51° C. which corresponds to an iodine value of about 50. The disadvantage in hydrogenating the oil to this degree is that the oil becomes generally non-plastic and as a result can be incorporated into shortenings only when the other ingredients are relatively soft, such as slightly hydrogenated cottonseed oil. Even in combination with relatively liquid ingredients, the hardened soybean oil is substantially limited to 10% to 15%, and the shortening is generally unsatisfactory because of the tendency to turn rancid by oxidation due to the presence of large amounts of unstable liquid components.

A soybean oil which has been hardened in accordance with the standard practice to an iodine value of above substantially 50, for example, in the range of 60 to 75, will not be stable against reversion, particularly under deep frying conditions. It is known that small amounts of such an oil have been used heretofore in shortenings, but in general it has been necessary to limit the amount of the soybean oil component to not substantially more than 10% to 15% to avoid the detection of undesirable odors and flavors.

It is well known that the most unsaturated fatty acids present as esters in the fatty oils exhibit a tendency to become changed to acids of the next degree of saturation during hydrogenation before those in turn commence to combine with hydrogen. Although there is this tendency toward preferential hydrogenation of the more unsaturated bodies, in actual practice the hydrogenation at a given temperature does not completely follow the ideal step-wise path and heretofore this has been believed to be due to the characteristics of the catalyst and the hydrogen gas used in the hydrogenating process. In general, it has been noted that the use of elevated temperatures tends to increase the selective nature of hydrogenation but that the use of relatively high temperatures has the effect of increasing the formation of hard isomerides of oleic acid. These isomerides may be present in such amounts as to make a product which is hard and brittle before it has become sufficiently hydrogenated to insure good keeping qualities. Lower temperatures of hydrogenation are believed to have a tendency to repress the formation of isomerides, such as iso-oleins, but at the expense of decreased selectivity.

Previously the catalyst and hydrogen selected for the process have been thought to be the controlling factors in determining the most desirable processing conditions and with this in mind the prior art utilized temperatures within the range of 135° C. to 200° C. The predominant proportion of the prior art operations concerned oils of the type of cottonseed oil, which oil did not involve reversion problems or the treatment of material proportions of highly unsaturated components. These temperatures were found suitable and have been used for years and applied to all oils indiscriminately.

I have found that if the hydrogenation of highly unsaturated oils, such as soybean oil and linseed oil, for example, is carried out at low temperatures, that is, temperatures preferably well below 135° C., that the stability or reversion characteristics of the resulting product are unexpectedly improved. By my process it is possible to produce a hydrogenated product which has the desired plasticity but which avoids the highly undesirable but typical reversion characteristics previously associated with soybean oil products, for example, when subjected to ordinary storage conditions of deep fat frying. It is now possible to prepare a soybeam oil stable under deep frying conditions and having an I. V. of substantially 75 or less. My product is characterized by a plasticity of substantially 100 percent greater than that of a product of the same iodine value prepared in accordance with the prior art.

These more highly unsaturated oils, such as soybean oil, are hardened selectively and the formation of iso-oleins is suppressed.

It should be particularly noted that soybean oil hardened in the conventional manner, that is, at temperatures of about 160° C., for example, will be unstable under deep frying conditions and revert unless such hydrogenation is continued until the iodine value of the oil is reduced to as low as about 50. When such a low iodine value is reached, a stable product which will not revert and acquire "off" flavors and odors may result but plasticity has been sacrificed. The plasticity of the hydrogenated oil of such a reduced iodine value materially restricts its use for it must be blended with a softer more plastic component to obtain a final shortening of the required plasticity, for example, of a commercial household shortening. Unhardened soybean oil refined in accordance with the usual practice also will revert.

The explanation of the so-called reversion under these two general conditions, i. e., ordinary storage and deep frying, may be that these characteristics in a hydrogenated soybean oil are caused by the presence of odor or flavor forming bodies which may be of several different types having apparently different origins. However, the novelty of my invention is not dependent upon the accuracy or validity of any explanatory theory of operation as any such explanatory theory is given merely to assist in the understanding of my invention.

There normally are present in the oil highly unsaturated components, such as linolenic glycerides, having three double bonds. The presence of three highly reactive double bonds may cause the formation of components having the objectionable reversion odors and flavors due to condensation, ring formation, or even ketone structures, presuming a slight amount of initial oxidation. It is to be expected that the presence of such components would affect the odor or taste of the oil.

However, this type of undesirable components susceptible to reversion in the refined soybean oil apparently may be avoided, eliminated, or made stable by selective hydrogenation of the soybean oil to an iodine value of only about 75, for example, provided the hydrogenation is carried out as described herein within the range of low temperatures disclosed. Apparently during the hydrogenation of soybean oil, for example, at the usual temperature of 160° C., suitable for cottonseed oil, additional odor forming bodies are created within the oil. These bodies give rise to the aldehydic odors which may be observed in the vented gas as hydrogenation progresses. This latter type of reversion product may be removed by further and intensive hydrogenation, and it was apparently for this reason that previously it has been necessary in many instances to accomplish their removal by hydrogenating the soybean oil to the low iodine value of about 50.

The formation of aldehydic odor forming bodies and others during the hardening process apparently is avoided by my process of hydrogenating these unsaturated oils, such as soybean oil, for example, at or near the low hydrogenation temperatures herein disclosed. Accordingly, it is no longer necessary to remove the reversion bodies by hydrogenating to a low iodine value and thus plasticity need not be sacrificed for stability.

Hydrogenating temperatures preferably are kept within the range of 80 to 135° C., for example. At an iodine value of about 75 plasticity is not sacrificed and values samewhat lower may be used without a serious loss of plasticity in the final fat product desired. In general, it is desirable to hydrogenate the oil to as low an iodine value as is possible without an undesirable sacrifice of plasticity to increase the stability of the oil against oxidation and the development of rancidity. Stable and plastic soybean products of high soybean oil content have been made with iodine values as low as 68, 65 and 61 by means of my process.

I have observed that a soybean oil, for example, which has been hardened to an I. V. of 75 at low temperatures as herein disclosed, has been freed from the odor forming bodies originally in the refined oil and that it is also as stable against reversion as an oil hydrogenated under ordinary prior art high temperature conditions to an I. V. of 50.

In the hydrogenation of relatively highly unsaturated oils, such as soybean oil, in accordance with my invention I preferably utilize pure hydrogen gas.

The catalyst which I prefer to use comprises a highly selective form of nickel catalyst of the type disclosed in the patent to Paterson, No. 2,123,342, issued July 12, 1938.

Although it is preferred to utilize the type of catalyst and hydrogen gas described above, I do not wish to be restricted to such use, inasmuch as other catalysts and hydrogen gases may be employed effectively.

The hydrogenation of the relatively highly unsaturated oil is accomplished by placing the oil in a suitable closed container with from approximately .05 to .2% by weight of a selective nickel catalyst. The purified hydrogen gas preferably is introduced into the bottom of the container under a pressure in the neighborhood of 45 lbs. per square inch and is caused to bubble up through the oil and catalyst. The hydrogenation chamber is maintained at a temperature of from 90–135° C. by any convenient means such as heating and cooling coils. As discussed above, the oil is not completely hydrogenated, but is carried to an iodine value in the neighborhood of 75 I. V. at which point the product has a lard-like consistency at room temperatures. The oil is permitted to cool to about 60–70° C. out of contact with the atmosphere and is then removed from the hydrogenation chamber and filtered. The filtered oil may then be subjected to the usual further process steps commonly utilized in producing a product meeting the specific commercial standards desired. These further process steps, for example, would include deodorization in which the oil is blown with steam under vacuum to remove certain undesirable volatile components, chilling, aeration, and texturization, after which it is ready for packaging. The treated oil may be blended, if desired, with other treated oils to obtain a final shortening product of specific characteristics.

In the case of soybean oil, it has been found that the preferred hydrogenating temperature is in the range of from 90 to 100° C. However, hydrogenation may be carried out at a temperature in the range of 100 to 110° C. or about 105° C. in order to decrease the amount of time required to reduce the iodine value a desired amount.

The following examples of good grade shortenings illustrate the greatly increased amounts of a soybean oil component which may be used with satisfactory results, when the soybean oil has been hydrogenated to an iodine value of below 75 in accordance with my invention.

| Example | Soybean base stock | | Cottonseed base stock | | Soybean hard stearine | |
|---|---|---|---|---|---|---|
| | Amt. used | I. V. | Amt. used | I. V. | Amt. used | I. V. |
| | Percent | | Percent | | Percent | |
| 1 | 64.5 | 68.0 | 34.0 | 71.5 | 1.5 | 1.0 |
| 2 | 55.0 | 65.0 | 42.5 | 87.5 | 2.5 | 1.0 |
| 3 | 37.0 | 61.0 | 61.0 | 83.5 | 2.0 | 1.0 |

The following table of test results indicates the desirable characteristics of the shortenings disclosed above.

| Example | Congeal | Color (Lovibond) | Penetration at 70° F. | Deep frying properties | Baking properties |
|---|---|---|---|---|---|
| 1 | 32.2 | 8Y—0.8R | 222 | Good | Good. |
| 2 | 32.7 | 5Y—0.5R | 225 | Good | Good. |
| 3 | 33.2 | 5Y—0.5R | 230 | Good | Good. |

The deep frying and baking properties of the shortenings were determined by standard and routine tests to which shortenings are customarily subjected in a control laboratory. In the extended deep fat frying test, for example, a quantity of shortening is disposed in a frying kettle and maintained at an elevated temperature of about 385° F. over a three day period. The hot fat is used at spaced intervals for frying three groups of seven freshly prepared standard doughnuts, and following each fry a small sample of the oil is taken for testing purposes and the loss of fat is replaced with fresh shortening. On the first day, eight fries are carried out, the first five being spaced one-hour apart and the last three being spaced one-half hour apart. On the second and third days, twelve and ten fries, respectively, are carried out at one-half hour intervals.

The above shortenings were rated as good on the basis of their behavior with respect to color, free fatty acid, smoking and odor throughout the test and by the rating on the doughnuts, which were tested for both odor and flavor upon completion of the frying and after having been stored one or more days. The good deep frying characteristics of the above shortenings is significant inasmuch as an undesirable odor and flavor would have been detected in most cases as early as within the period of the first five fries if the soybean oil component were not stable against reversion.

The baking test is carried out by utilizing a quantity of the shortening to be tested in the baking of a standard pound cake which, in addition to the shortening, comprises a predetermined amount of sugar, salt, flour, milk and eggs. The ingredients are of standard grade and are measured carefully at a standard temperature and are added to the batter in a predetermined order. The sugar and shortening and subsequently the eggs are creamed under controlled conditions of time, temperature and speed of mixing; after creaming, the flour and milk are added under the same controlled conditions to form the finished batter. The finished batter is placed into two standard pound cake pans and baked in an oven maintained at 365° F. and for a period of 75 to 90 minutes. After baking, the cakes are removed and allowed to cool in the pans over night. The above shortenings tested in this manner were rated good for cake baking purposes on their behavior during creaming and batter preparation and on the cream and batter volumes obtained. The rating also was good based on the volume and characteristics of the cake, which was scored for outside appearance (crust, contour, etc.) and internal characteristics (grain, texture, eating qualities, etc.).

It will be noted in addition to the good deep frying and baking properties discussed above, the improved shortenings of my invention are characterized by a penetration and congeal point within the range desired in good grade shortenings. Furthermore, the iodine value of all of the compounds of the shortenings are sufficiently low to retard normal oxidation and the development of rancidity.

Although the above examples have been limited to the use of hydrogenated soybean oil in combination with hydrogenated cottonseed oil, which is a usual component of well known standard shortenings, this has been done merely for convenience in illustrating the improved characteristics of the soybean oil component. It is to be understood that the improved soybean oil hydrogenated in accordance with my invention may be used in an increased amount in combination with any of the shortening compounds heretofore utilized in the art in the production of edible products of standard quality.

As illustrative of the scope of my invention, I have prepared a satisfactory shortening comprising 89½% soybean oil hydrogenated to an iodine value of 68.6 in accordance with my invention, 6½% cocoanut oil having an iodine value of 10, and 4% soybean hard stearine having an iodine value of 1.0.

My invention is not to be limited to the preparation of a soybean oil which is suitable for use in increased amounts in all hydrogenated shortenings, although in general this type of shortening is preferred. By virtue of the improved plasticity of a soybean oil stable against reversion under deep frying conditions which has been prepared in accordance with my invention, it is possible to use the oil in combination with relatively small amounts of unhardened oil to form good grade compound shortenings. For example, I have prepared a satisfactory shortening comprising 70% soybean oil hydrogenated to an iodine value of 75 in accordance with my invention, 5% soybean hard stearine having an iodine value of 1.0, and 25% unhardened cottonseed oil.

It will be apparent from the above description that my invention will be susceptible to many variations by persons skilled in the art and all such variations are to be considered within the scope of my invention as defined in the following claims.

I claim:

1. A method of stabilizing soybean oil against reversion under deep frying conditions utilizing temperatures in the nature of 375° F., which comprises hardening the oil and reducing the iodine value to at least 75 by passing hydrogen through the oil mass in the presence of a nickel catalyst while maintaining the oil at a temperature of less than 110° C.

2. A method of stabilizing soybean oil against reversion under deep frying conditions and for preparing hydrogenated soybean oil having a plasticity suitable for use in a major proportion in a commercial grade of all-hydrogenated vegetable oil shortening material, which method comprises hydrogenating the soybean oil at a temperature within the range of 80 to 135° C. in the presence of a nickel catalyst for a sufficient time to reduce the iodine value to within the range of from 60 to 75.

3. A method of stabilizing soybean oil against reversion under deep frying conditions and for preparing hydrogenated soybean oil of a plasticity suitable for use in a major proportion in a commercial grade of all-hydrogenated vegetable oil shortening material which method comprises hydrogenating the soybean oil at a temperature within the range of 90 to 110° C. in the presence of a nickel catalyst for a sufficient time to reduce the iodine value to approximately 75.

4. In a method of preparing a plastic shortening from refined soybean oil, said shortening having substantially the iodine value of standard commercial shortenings and having substantial stability against reversion under conditions of deep fat frying the step of passing hydrogen through said oil in the presence of a selective nickel catalyst while maintaining a temperature within the oil mass substantially below 135° C.

5. In a process of stabilizing soybean oil against reversion under deep frying conditions the step of treating the oil with hydrogen in the presence of a nickel catalyst for a sufficient time to reduce the iodine value of the oil to substantially 75, while maintaining the oil at a temperature not substantially greater than 110° C.

6. In a method of hydrogenating refined soybean oil to stabilize the oil against reversion when subjected to temperatures in the neighborhood of 375° F. and for preparing a hydrogenated soybean oil of a plasticity suitable for use in a major proportion in a commercial grade of all-hydrogenated vegetable oil shortening material, the step of passing hydrogen through said oil in the presence of a selective nickel catalyst while maintaining a temperature within the oil mass within the range of 100 to 110° C.

7. In a process of stabilizing soybean oil against reversion under deep frying conditions the step of treating the oil with hydrogen in the presence of a nickel catalyst for a sufficient time to reduce the iodine value of the oil to at least 75, while maintaining the oil at a temperature in the neighborhood of 105° C.

ARNE GUDHEIM.